(12) United States Patent
Li (10) Patent No.: US 9,749,911 B2
(45) Date of Patent: Aug. 29, 2017

(54) METHOD AND APPARATUS FOR OBTAINING INFORMATION FROM TARGET BASE STATION

(71) Applicant: HUAWEI TECHNOLOGIES CO., LTD., Shenzhen (CN)

(72) Inventor: Jianbo Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 294 days.

(21) Appl. No.: 14/548,708

(22) Filed: Nov. 20, 2014

(65) Prior Publication Data

US 2015/0133123 A1    May 14, 2015

Related U.S. Application Data

(63) Continuation of application No. 13/446,266, filed on Apr. 13, 2012, now Pat. No. 8,908,572, which is a (Continued)

(30) Foreign Application Priority Data

Oct. 15, 2009    (CN) .......................... 2009 1 0180824

(51) Int. Cl.
*H04W 36/00* (2009.01)
*H04W 76/02* (2009.01)
(Continued)

(52) U.S. Cl.
CPC ... *H04W 36/0055* (2013.01); *H04W 36/0016* (2013.01); *H04W 76/02* (2013.01); *H04W 72/0426* (2013.01); *H04W 92/20* (2013.01)

(58) Field of Classification Search
CPC ............. H04W 36/0055; H04W 76/02; H04W 36/0016; H04W 72/0426; H04W 92/20
See application file for complete search history.

(56) References Cited

U.S. PATENT DOCUMENTS

| 2002/0013149 A1 | 1/2002 | Threadgill et al. |
| 2004/0062214 A1* | 4/2004 | Schnack .............. H04B 7/2606 370/315 |

(Continued)

FOREIGN PATENT DOCUMENTS

| CN | 1464761 | 12/2003 |
| CN | 1464761 A | 12/2003 |

(Continued)

OTHER PUBLICATIONS

Russian Notice of Allowance dated Dec. 18, 2013 in corresponding Russian Patent Application No. 2012119782/07 (029761) (10 pages) (7 pages English Translation).
(Continued)

*Primary Examiner* — Michael Thier
*Assistant Examiner* — Brian Cox
(74) *Attorney, Agent, or Firm* — Staas & Halsey LLP (57) ABSTRACT

A method and an apparatus for obtaining information from a target base station are disclosed. The method includes: when a source base station needs to obtain information from a target base station, receiving, through an air interface, a system message in a certain format broadcast by the target base station; and parsing the system message, and obtaining required information. Through the present invention, an LTE base station can communicate with another LTE base station or with a heterogeneous base station directly through an air interface, thereby increasing the efficiency of communication between base stations.

13 Claims, 3 Drawing Sheets

Related U.S. Application Data continuation of application No. PCT/CN2010/077465, filed on Sep. 29, 2010.

(51) Int. Cl.
*H04W 72/04* (2009.01)
*H04W 92/20* (2009.01)

(56) References Cited

U.S. PATENT DOCUMENTS

| | | | |
|---|---|---|---|
| 2004/0107294 A1 | 6/2004 | Chen | |
| 2006/0039329 A1* | 2/2006 | Samuel | H04W 48/08 370/335 |
| 2007/0286112 A1 | 12/2007 | Prakash et al. | |
| 2007/0287459 A1 | 12/2007 | Diachina et al. | |
| 2008/0080388 A1 | 4/2008 | Dean et al. | |
| 2008/0090575 A1 | 4/2008 | Barak et al. | |
| 2008/0181249 A1 | 7/2008 | Karaoguz | |
| 2009/0125363 A1 | 5/2009 | Frederiksen et al. | |
| 2009/0154588 A1 | 6/2009 | Chen et al. | |
| 2010/0014429 A1 | 1/2010 | Kim et al. | |
| 2010/0189074 A1* | 7/2010 | Liao | H04W 36/0055 370/331 |
| 2010/0265884 A1* | 10/2010 | Vikberg | H04W 4/14 370/328 |
| 2010/0296448 A1 | 11/2010 | Vainikka et al. | |
| 2011/0194535 A1* | 8/2011 | Johansson | H04W 28/24 370/331 |
| 2012/0015646 A1 | 1/2012 | Burbidge et al. | |

FOREIGN PATENT DOCUMENTS

| | | |
|---|---|---|
| CN | 101031132 | 9/2007 |
| CN | 101031132 A | 9/2007 |
| CN | 101507335 A | 8/2009 |
| CN | 101521909 | 9/2009 |
| CN | 101541052 | 9/2009 |
| GB | 2427788 | 1/2007 |
| RU | 2348113 C2 | 2/2009 |
| WO | WO 2008/086648 * | 7/2008 |
| WO | WO 2008/086648 A1 | 7/2008 |
| WO | 2009/025494 | 2/2009 |
| WO | WO 2010/055367 A1 | 5/2010 |

OTHER PUBLICATIONS

International Search Report, mailed Jan. 6, 2011, in corresponding International Application No. PCT/CN2010/077465.

Extended European Search Report dated Jul. 27, 2012 issued in corresponding European Patent Application No. 10823053.3.

Nokia Corporation/Nokia Siemens Networks, "Defining E-UTRAN GERAN External Networks Assisted Cell Change (NACC)", 3GPP GERAN #35, Aug. 2007, pp. 1-5.

Alcatel-Lucent, "Consideration of Backhaul Technology Evolution in Support of CoMP", 3GPP TSG-RAN WG1 #57, May 2009, pp. 1-6.

Chinese Office Action, dated Jun. 6, 2013, in corresponding Chinese Patent Application No. 200910180824.0 (12 pages).

Chinese Office Action, dated Aug. 16, 2012, in corresponding Chinese Patent Application No. 200910180824.0.

International Search Report mailed Jan. 6, 2011 issued in corresponding International Patent Application No. PCT/CN2010/077465.

Written Opinion of the International Searching Authority mailed Jan. 6, 2011 issued in corresponding International Patent Application No. PCT/CN2010/077465.

Chinese Office Action mailed Feb. 16, 2013, in corresponding Chinese Patent Application No. 200910180824.0.

Chinese Office Action mailed Nov. 14, 2012, in corresponding Chinese Patent Application No. 200910180824.0.

Non-Final Office Action dated Sep. 19, 2013 in parent U.S. Appl. No. 13/446,266 (49 pages).

Final Office Action dated May 8, 2014 in parent U.S. Appl. No. 13/446,266 (27 pages).

Notice of Allowance mailed Oct. 9, 2014 in parent U.S. Appl. No. 13/446,266 (14 pages).

U.S. Appl. No. 13/446,266, filed Apr. 13, 2012, Jianbo Li, Huawei Technologies Co., Ltd. Shenzhen, P.R. China.

* cited by examiner

METHOD AND APPARATUS FOR OBTAINING INFORMATION FROM TARGET BASE STATION

CROSS-REFERENCE TO RELATED APPLICATIONS

This application is a continuation of U.S. patent application Ser. No. 13/446,266, filed on Apr. 13, 2012, which is a continuation of International Application No. PCT/CN2010/077465, filed on Sep. 29, 2010. The International Application claims priority to Chinese Patent Application No. 200910180824.0, filed on Oct. 15, 2009. The afore-mentioned patent applications are hereby incorporated by reference in their entireties.

FIELD OF THE INVENTION

The present invention relates to the field of communications technologies, and in particular, to a method and an apparatus for obtaining information.

BACKGROUND OF THE INVENTION

In the current LTE (Long Term Evolution, long term evolution) radio communication architecture, when LTE base stations communicate with each other, or when an LTE base station communicates with base stations in networks of other standards, the communication is mainly based on an X2 interface or an S1 interface. For example, when a cell handover is required, after learning a neighboring cell, an LTE base station needs to obtain handover-related information such as cell load and system bandwidth of the neighboring cell through the X2 interface or S1 interface, and then make a handover decision according to the obtained handover-related information.

SUMMARY OF THE INVENTION

The present invention provides a method and an apparatus for obtaining information, which can increase the efficiency of communication between base stations.

To achieve the above objective, the present invention provides the solutions as described in claims.

As it may be seen from the embodiments of the present invention that, when information needs to be obtained from a target base station, a system message broadcast by the target base station is received through an air interface; the system message is parsed and required information is obtained. In this way, an LTE base station can communicate with another LTE base station or with a heterogeneous base station directly through an air interface, thereby increasing the efficiency of communication between base stations.

DETAILED DESCRIPTION OF THE EMBODIMENTS

To make the above objective, features, and advantages of the present invention more comprehensible, the present invention is hereinafter described in detail with reference to the accompanying drawings and exemplary embodiments.

Figure 6:
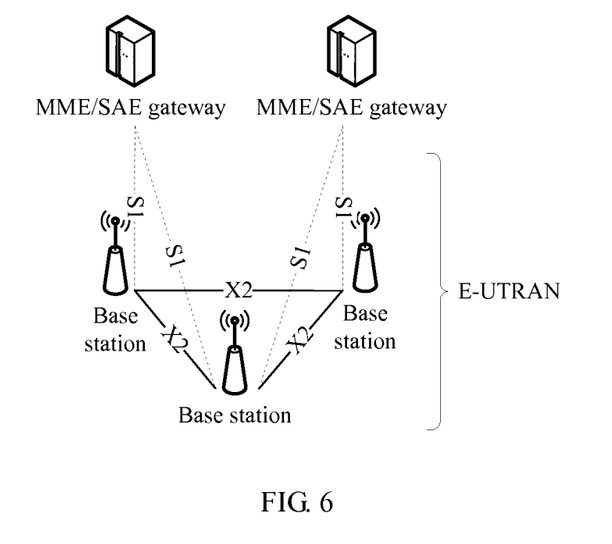
FIG. 6 is a schematic diagram of an LTE system.

FIG. 6 is a schematic diagram of an LTE (Long Term Evolution, long term evolution) system.

Two types of nodes are defined in the LTE system: base station (eNB, HeNB) and access gateway (MME/SAE gateway). The base station belongs to an E-UTRAN, and the MME/SAE gateway belongs to an evolved packet core (EPC) network. An X2 interface is defined between base stations to implement the information interaction between neighboring eNBs. An S1 interface is defined between the base station and the MME/SAE gateway. Each base station corresponds to one or multiple cells. Each cell may serve one and multiple user terminals. The user terminals include but are not limited to: a mobile phone, a notebook computer, a netbook, a PDA, consumer electronics with a radio communication module, and a radio communication module. The information interaction between the base station and the user terminal is usually performed through an air interface.

During implementation of the present invention, the inventor finds that because the X2 interface is usually based on the Ethernet, the X2 interface between two base stations may pass through multiple routers, and a certain delay may exist at each router. Therefore, the time required for each information interaction is not determined Meanwhile, multiple information interactions may be required when communication is performed between base stations. Therefore, it is difficult to satisfy the requirements in a scenario in which high requirements are imposed on the handover delay.

Figure 1:
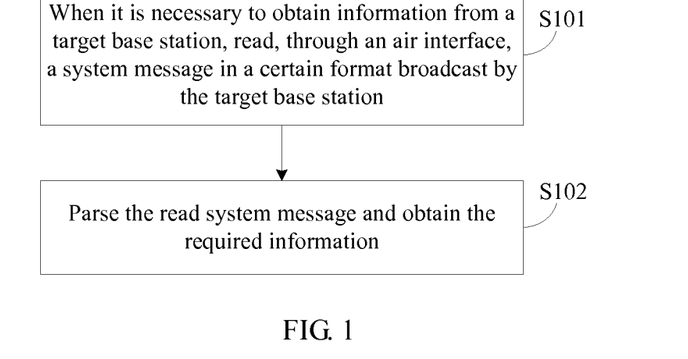
FIG. 1 is a flowchart of a method according to an embodiment of the present invention.

As shown in FIG. 1, the method for obtaining information from a target base station according to an embodiment of the present invention includes the following steps:

S101: When a source base station needs to obtain information from a target base station, the source base station directly reads, through an air interface, a system message in a certain format broadcast by the target base station.

First, a system message in a certain format needs to be preset, where the system message is used for communication between base stations through an air interface. In specific implementation, the name of the system message in a certain format may be defined as eNB_SIB, and the base station may broadcast the system message through an air interface. The base station may include an LTE base station, or base stations of GERAN (GSM/EDGE Radio Access Network, GSM/EDGE radio access network), CDMA (Code Division Multiple Access, code division multiple access), and WCDMA (Wideband CDMA, wideband code division multiple access) systems.

It should be noted that the format of the system message may be an ASN.1 format. ASN.1 is an ISO/ITU-T standard, and describes a data format for representing, encoding, transmitting, and decoding data. It provides a whole set of standard formats for describing structures of objects, regardless of language execution, specific representation of the data, and specific applications. Certainly, in actual applications, the format of the system message is not limited to the above formats, so long as the format is agreed on by each base station beforehand, so that the base station can normally parse the system message after reading the system message through the air interface.

S102: The source base station parses the read system message and obtains the required information.

Here, the required information may be: handover-related information such as cell load, system bandwidth, and service support capability of a neighboring cell.

In this way, by using the method provided by the embodiment of the present invention, if the source base station needs to obtain information from the target base station, the source base station directly reads, through the air interface, the system message broadcast by the target base station, and parses the system message to obtain the required information. Therefore, the LTE base station can directly communicate with another LTE base station, or heterogeneous base stations such as those in GERAN, CDMA, and WCDMA systems through an air interface. Some messages may be transferred from the S1 interface or X2 interface to the air interface for transmission, thereby increasing the efficiency of communication between base stations.

The following describes how to broadcast the system message in a certain format through the air interface.

First, if the source cell of the source base station and the target cell of the target base station are a macro cell and a micro cell, respectively, the following two cases exist:

1. For an LTE FDD (Frequency Division Duplex, frequency division duplex) base station, because the communication is based on frequency division, the target base station may directly broadcast the system message in a certain format through a downlink frequency.

2. For an LTE TDD (Time Division Duplex, time division duplex) base station, because the communication is based on time division, the target base station may allocate a timeslot for the system message in a certain format. Certainly, a broadcast mechanism may also be added in the base station.

If both the source cell and the target cell are macro cells, broadcasting the system message through the air interface may be implemented by microwave transmission.

If the base station needs to read the system message through the air interface, the base station needs to implement the reading function beforehand. For example, for the LTE FDD base station, the receiving function of the downlink carrier frequency needs to be implemented. Specifically, for the LTE FDD base station, the receiving function of the downlink frequency may be added to a radio frequency processing unit. For the LTE TDD base station, specific timeslots may be designed in the radio frequency processing unit to receive downlink system messages. Certainly, no matter whether the base station is an LTE FDD base station or an LTE TDD base station, a radio frequency module for independently receiving the downlink system message may also be designed, and is completely independent of the original radio frequency module in the LTE base station.

The function for parsing the received system message may be added to a baseband processing unit of the LTE base station to parse the read system message.

According to different actual application scenarios, different information may be carried in the system message. The following describes the embodiments of the present invention in detail with reference to specific application scenarios.

Application scenario 1: In the application scenario, when it is necessary to hand over a terminal to a neighboring cell, the source base station reads, through an air interface, a system message in a certain format broadcast by the target base station of the neighboring cell, then parses the read system message, and obtains handover-related information, so as to determine the target base station according to the handover-related information and complete the cell handover.

For example, when it is necessary to hand over the terminal to the neighboring cell, to make a handover decision by comprehensively considering the factors such as cell load and system bandwidth, the source base station needs to obtain the handover-related information such as cell load and system bandwidth of the target base station. In this case, the system message may be used to carry the information such as the load, system bandwidth, and service support capability of the cell. In this way, during the handover decision, many factors may be considered comprehensively. For example, according to the cell load, the source base station may select a target cell with the lightest load from multiple target cells where the signal strength satisfies the condition for the handover, so as to coordinate the load balancing of each cell and enhance the performance of the system as a whole. According to the system bandwidth, the source base station may first judge whether the system bandwidth of the target cell satisfies a current service requirement of the UE, and then decide to which target cell the UE will be handed over. For example, if the bandwidth required by the current service of the UE is 10 Mbps, while the system bandwidth of a neighboring cell is 5 Mbps, the source base station may select not to hand over the UE to the cell preferentially. According to the service support capability, the normal proceeding of the service of the UE after the handover may be guaranteed, that is, the source base station selects to hand over the UE to the target cell only when the target cell can support the service of the UE.

It should be noted that with the continuous incoming handover or outgoing handover of the UE in the cell, the information such as the load information of the cell may change in real time, and the system message may be updated accordingly, that is, the load information of the cell is broadcast in real time.

Therefore, if a cell handover is required, the base station of the source cell may first learn a neighboring cell through the neighboring cells reported by the UE and preconfigured neighboring cells. Then the base station of the source cell reads the system message in a certain format broadcast by the base station of the neighboring cell, and obtains the handover-related information such as the load and/or system bandwidth and/or service support capability of the neighboring cell from the system message. According to the message/messages, the base station of the source cell then decides to which target cell the UE will be handed over. That is, in this way, the base station of the source cell does not need to first send an admission request to the target cell and then after receiving the reply, confirm whether the target cell is overloaded, but may obtain, by directly reading the system message of the neighboring cell, the handover-related information such as the load and service support capability of the neighboring cell.

Figure 2:
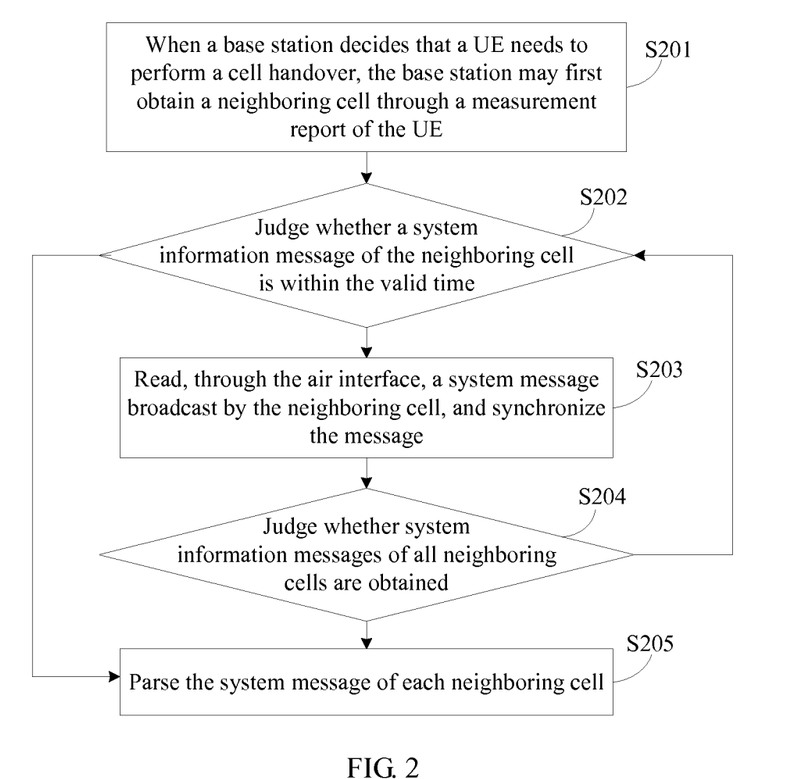
FIG. 2 is a flowchart of another method according to an embodiment of the present invention.

The following describes the specific procedure for receiving a system message in detail. As shown in FIG. 2, the procedure includes the following steps:

S201: When a source base station decides that a UE needs to perform a cell handover, the source base station may first obtain a neighboring cell through a measurement report of the UE.

It should be noted that among the target cells reported by the UE, cells that do not have a neighboring relationship with the source cell of the source base station may exist. In this case, the source base station may remove the cells not having a neighboring relationship from the target cells reported by the UE, and then read, through the air interface, a system message broadcast by a cell having a neighboring relationship with the source cell.

S202: Judge whether a system message of the neighboring cell obtained through the air interface last time is within the valid period; if so, go to step S205, and otherwise, go to step S203.

That is, after the system message is obtained last time, the obtained system message may be stored, but a valid period may be set. When a system message is required at this time, if the system message obtained last time does not exceed the valid period, the system message obtained last time may be used, and it is not necessary to reread the system message of the neighboring cell; otherwise, if the system message obtained last time already exceeds the valid period, it indicates that the system message of the neighboring cell may have been updated, and that the system message stored last time is already invalid. Therefore, the system message of the neighboring cell may be reread through the air interface.

S203: Read, through the air interface, a system message broadcast by the neighboring cell, and synchronize the message.

Because the system messages of the target cell are broadcast continuously, the received system messages may be a string of bit streams with the header of one message connected to the trailer of another message, and a message can be read correctly only after the header and trailer of the message are determined. Therefore, it is necessary to synchronize messages. The purpose is to correctly read the system messages of the target cell. Specifically, many methods may be used for synchronization. For example, a uniform message header may be added to the system messages, and the lengths of all the system messages are the same. Therefore, after reading a system message of the neighboring cell, the base station may first perform an AND operation between a local bit stream and the read system message. If the result is a high level, the matching succeeds, and the correct system message may be read after the result is shifted backward for a certain length.

S204: Judge whether system messages of all neighboring cells are obtained; if so, go to step S205, and otherwise, go to step S202.

The purpose of receiving the system messages of all neighboring cells is to select a best neighboring cell from the neighboring cells for a handover. Certainly, it may also be unnecessary to obtain system messages of all neighboring cells.

S205: Parse the system message of each neighboring cell.

The process of parsing the system messages is to parse each obtained system message to obtain the required information, such as system bandwidth and cell load, to be used in the cell decision.

For example, it is assumed that CELL 1 is an LTE cell in hot coverage under CELL 2 and CELL 3. When a user needs to be handed over from CELL 1, the base station of CELL 1 searches for CELL 2 and CELL 3 through the preconfigured neighboring cells, and reads the system messages of the corresponding neighboring cells through the air interface, where the system messages are broadcast by the base stations of CELL 1, CELL 2, and CELL 3. The base station obtains the handover-related information such as cell load, system bandwidth, and service support capability of CELL 2 and CELL 3 from the system messages. In the case that the cell signal strength of both CELL 2l and CELL 3 is in the receivable range, a more suitable cell is selected as a target cell for the handover of the user. The cell signal strength may be reported by the UE. For example, the signal strength of the UE in the target cell may be measured by the UE. For example, when the neighboring cells are determined as CELL 2 and CELL 3, the UE may be notified of receiving signals of CELL 2 and CELL 3, and the UE reports the signal strength of CELL 2 and CELL 3 to the base station.

However, in the prior art, a possible procedure is as follows: The source base station of the source cell needs to first learn the target cell through the reporting of the UE, and send a request to the target base station of the target cell through an X2 interface or S1 interface, and then the target base station of the target cell makes a response through the X2 interface or S1 interface. If the UE finds that there are multiple target cells, the source base station needs to obtain the information such as the load of each target cell respectively one by one, and then compare the load and service support capability of each cell to decide to which target cell the UE will be finally handed over. In addition, when an inter-system cell handover is required (for example, a handover from the LTE system to the GERAN, CDMA, or WCDMA system), the handover can be completed only after a series of information interactions with multiple network elements such as the gateway of each system through the S1 interface.

Evidently, by using the method provided by the embodiment of the present invention, fewer signaling interactions are required, and the efficiency of the cell handover is higher.

Application scenario 2: In the application scenario, on the basis of the above application scenario 1, when the determined target cell is a GERAN cell, the base station of the GERAN cell may add a RIM (RAN Information Message, radio access network information) message to a system message in a certain format for broadcasting. When a NACC (Network assisted cell change) procedure is executed to speed up the access to the GERAN cell, the RIM message of the GERAN cell needs to be obtained; in this case, the RIM message of the GERAN cell can be directly obtained from the system message read from the GERAN cell.

That is, if the target cell for the handover is a GERAN cell, the NACC procedure may be executed to speed up the access to the GERAN cell. However, if the NACC procedure needs to be executed, the RIM message of the target GERAN cell needs to be obtained. According to the method of the embodiment of the present invention, the base station of the target GERAN cell may directly add the RIM message to the system message in a certain format for broadcasting. In this way, when it is necessary to hand over the UE to the target GERAN cell, the source base station directly parses the system message that is already read during the handover decision to obtain the required RIM message, and execute the NACC procedure.

However, if the RIM message is not read through the air interface, a Get request can be sent to the base station of the neighboring cell only through a terrestrial link. The base station of the neighboring cell also needs to return a response through the terrestrial link, and multiple network elements are involved during the period. Therefore, it inevitably takes a long time to obtain the RIM message, which is unfavorable for the UE to access the GERAN cell quickly.

The embodiment of the present invention not only improves the handover performance, assists the UE in selecting a cell with the lightest load, and increases the overall utilization of the radio network, but also saves the time for the UE to access the GERAN cell in the cell change procedure with the GERAN.

For example, it is assumed that CELL1, CELL2, and CELL3 are all macro cells. When the user requires a handover from CELL1 to CELL2 or CELL3, if CELL2 or CELL3 is a GERAN cell, the base station of CELL1 reads the system messages sent by the base stations of CELL2 and CELL3 through an air interface. The base station of CELL1 obtains handover-related information such as the cell load of CELL 2 and CELL 3 from the system messages, and selects a more suitable cell (such as a cell with a lighter load) for the UE to access in the case that the difference between the signal strength of CELL 2 and the signal strength of CELL 3 is not great.

When the user accesses a GERAN cell from an LTE cell, to speed up the access speed, the NACC (network assisted cell change) procedure may be executed. In this case, a system message that is broadcast by the base station of the target GERAN cell and read through the air interface can be parsed to obtain a RIM message; if the RIM message can be obtained successfully, the UE may be allowed to directly execute the NACC procedure.

Application scenario 3: In the application scenario, when a voice fallback is required, the source base station may read, through the air interface, a system message in a certain format broadcast by the base station of the neighboring cell, then parse the read system message, and obtain the handover-related information, so as to determine the target cell according to the handover-related information and complete the cell handover.

In specific implementation, corresponding message fields may be added to the system message. The base station of the source cell obtains related information of the target cell by reading a system message in a certain format carrying the message fields related to the voice fallback.

For example, a UE served by an LTE base station needs to perform a voice service, but the LTE base station does not support the voice service. In this case, a voice fallback is required to hand over the UE to other cells supporting the voice service. It should be noted that the voice fallback is different from an ordinary cell handover. In the voice fallback procedure, the base station of the source cell does not need to notify the base station of the target cell that a UE is handed over, but directly notifies the UE of handing over to a target cell. Therefore, essentially, the voice fallback also belongs to a cell handover procedure. To ensure better services for the UE and better performance of the system, a handover decision may also be made before the handover. During the handover decision, many factors may also be considered comprehensively, the specific procedure of which is similar to the cell handover described above and is not further described here.

In conclusion, the system message in the embodiment of the present invention is extendable. If more service scenarios need to be supported, more fields may be added to the system message. Therefore, an LTE base station can directly communicate with another LTE base station, or heterogeneous base stations such as those in GERAN, CDMA, and WCDMA systems through an air interface, and does not need to obtain required information through the X2 interface or S1 interface, thereby increasing the efficiency of communication between base stations.

In addition, by using the method provided by the embodiment of the present invention, some messages of the X2 interface (such as some messages during the cell handover) are converted into air interface messages. Therefore, the amount of data transmitted on the X2 interface can be decreased, and the bandwidth required by the X2 interface is decreased, thereby further decreasing the lease cost of the X2 interface. Usually, the lease cost of the X2 interface is in proportion to the leased bandwidth. If more data needs to be transmitted, the bandwidth to be leased is greater, and accordingly, the lease cost is higher.

Figure 3:
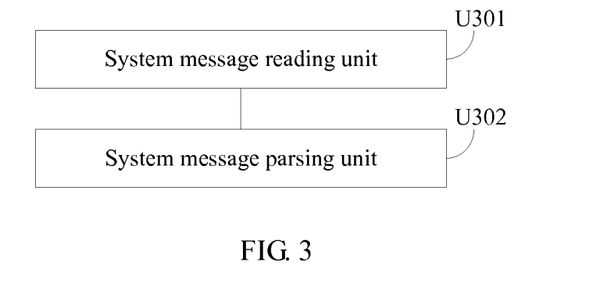
FIG. 3 is a schematic diagram of a first apparatus according to an embodiment of the present invention.

Corresponding to the method for obtaining information from the target base station according to the embodiment of the present invention, an embodiment of the present invention also provides an apparatus for obtaining information from a target base station. As shown in FIG. 3, the apparatus includes the following units:

a system message reading unit U301, configured to read, through an air interface, a system message in a certain format broadcast by a target base station when it is necessary to obtain information from the target base station; and a system message parsing unit U302, configured to parse the read system information and obtain required information.

By using the apparatus provided by the embodiment of the present invention, an LTE base station can communicate with another LTE base station or with a heterogeneous base station directly through an air interface, thereby increasing the efficiency of communication between base stations.

Figure 4:
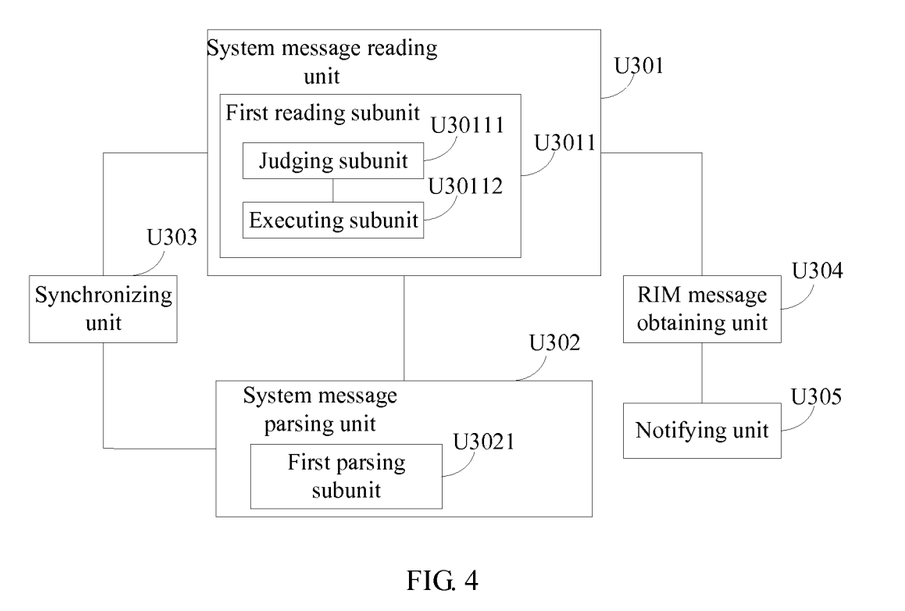
FIG. 4 is a schematic diagram of a second apparatus according to an embodiment of the present invention.

When it is necessary to obtain information from the target base station may be when it is necessary to hand over a terminal to a neighboring cell. In this case, as shown in FIG. 4, the system message reading unit U301 includes:

a first reading subunit U3011, configured to read, through the air interface, the system message in a certain format broadcast by a base station of a neighboring cell when it is necessary to hand over the terminal to the neighboring cell.

Accordingly, the system message parsing unit U302 includes:

a first parsing subunit U3021, configured to parse the read system message and obtain handover-related information used for determining a target cell according to the handover-related information and completing a cell handover.

If the system message of the neighboring cell read through the air interface last time is within the valid period, the system message read last time may be used without rereading a system message through the air interface; in this case, the first reading subunit U3011 includes:

a judging subunit U30111, configured to judge whether the system message of the neighboring cell obtained last time is within the valid period; and an executing subunit U30112, configured to read, through the air interface, a system message in a certain format broadcast by the base station of the neighboring cell if the system message of the neighboring cell obtained last time through the air interface is not within the valid period.

Because system messages of the base station of the neighboring cell may be broadcast continuously, the read system messages may be a string of bit streams with the header of one message connected to the trailer of another message. Therefore, message synchronization is required. In this case, the apparatus further includes:

a synchronizing unit U303, configured to synchronize the read system message after the system message in a certain format broadcast by the base station of the neighboring cell is read through the air interface, whereupon the synchronized message is sent to the system message parsing unit.

When the target cell is a GERAN cell, a system message of the GERAN cell may be parsed to obtain a RIM message, and the UE is notified of executing a NACC procedure. In this case, the apparatus further includes:

a RIM message obtaining unit U304, configured to parse a system message of the GERAN cell and obtain a RIM message; and a notifying unit U305, configured to send the RIM message to the terminal so that the terminal executes a NACC procedure.

Figure 5:
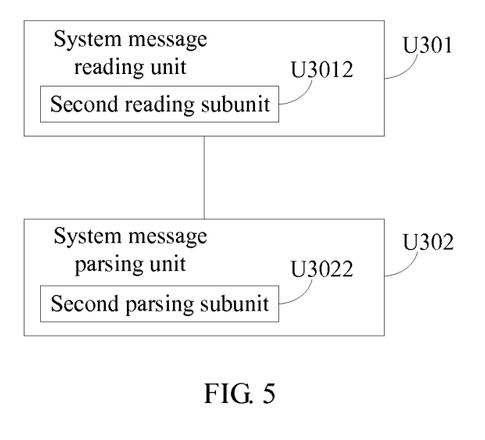
FIG. 5 is a schematic diagram of a third apparatus according to an embodiment of the present invention.

In addition, when it is necessary to obtain information from the target base station may be when it is necessary to perform a voice fallback. In this case, as shown in FIG. 5, the system message reading unit U301 includes:

a second reading subunit U3012, configured to read, through the air interface, the system message in a certain format broadcast by the base station of the neighboring cell when it is necessary to perform a voice fallback.

Accordingly, the system message parsing unit U302 includes:

a second parsing subunit U3022, configured to parse the read system message and obtain handover-related information used for determining a target cell according to the handover-related information and completing a voice fallback.

The system message parsing unit U302 may be added in the baseband processing unit of the base station.

The system message reading unit U301 may be added in the radio frequency processing unit of the base station. Specifically, for an LTE FDD base station, the receiving function of the downlink frequency may be added in the radio frequency processing unit; and for an LTE TDD base station, specific timeslots may be designed in the radio frequency processing unit to receive downlink system messages. In addition, the system message reading unit U301 may be an independent radio frequency unit, which is independent of the radio frequency processing unit of the base station.

It is understandable to persons of ordinary skill in the art that all or part of the steps of the methods according to the foregoing embodiments may be implemented by a hardware module, or a combination of hardware modules, or a combination of chipsets such as processors and memories, or implemented by relevant hardware, processors, and chipsets instructed by programs. The programs may be stored in a computer readable storage medium. When the programs are executed, the following steps are included: when information needs to be obtained from a target base station, reading, through an air interface, a system message in a certain format broadcast by the target base station; and parsing the read system message, and obtaining required information. The storage medium is a ROM/RAM, a magnetic disk, or a CD-ROM.

The method and apparatus for obtaining information from a target base station according to the present invention have been described in detail. Although the principle and implementation of the present invention are described with reference to exemplary information, the embodiments are only intended to help understand the method and core idea of the present invention. In addition, with respect to the implementation and applicability of the present invention, modifications and variations may be made by persons of ordinary skill in the art according to the idea of the present invention. Therefore, the specification shall not be construed as a limitation on the present invention.

What is claimed is:

1. A base station, comprising an S1 interface, to define a first communication path between the base station and an evolved packet core (EPC) network, and an X2 interface, to define a second communication path between the base station and another base station, the base station further comprises:

an air interface, configured to provide a third communication path between the base station and the another base station;

a processor, configured to,
when the base station needs to send first information to the another base station, generate an air message carrying the first information and send the air message carrying the first information to the another base station through the air interface; or
when the base station needs to obtain second information from the another base station, receive an air message carrying the second information from the another base station through the air interface,
wherein the first or second information in the air message is at least one part of information transmitted between the base station and the another base station, and other parts of the information transmitted between the base station and the another base station is transmitted through the S1 interface or the X2 interface.

2. The base station according to claim 1, wherein the air message is a system message.

3. The base station according to claim 2, wherein a format of the system message is an ASN.1 format.

4. The base station according to claim 1, wherein when the base station hands over a user equipment (UE) to the another base station, the base station needs to send the first information to the another base station, and the first information in the air message comprises handover-related information used for determining a target cell and completing a cell handover.

5. The base station according to claim 1, wherein when the base station performs a voice fallback to a UE, the base station needs to send the first information to the another base station, and the first information in the air message comprises handover-related information used for determining a target cell and completing the voice fallback.

6. The base station according to claim 1, wherein the processor is configured to determine whether an air message previously received is within a valid period, and when the air message previously received is not within a valid period, to receive the air message carrying the second information from the another base station through the air interface.

7. The base station according to claim 6, wherein the processor is further configured to synchronize the received air message.

8. The base station according to claim 1, wherein when the base station is a frequency division duplex (FDD) base station, the processor is configured to broadcast the air message through a downlink frequency to the another base station.

9. The base station according to claim 1, wherein when the base station is a time division duplex (TDD) base station, the processor is further configured to allocate a timeslot for the air message.

10. The base station according to claim 1, wherein when the base station is a time division duplex (TDD) base station, the processor is configured to cause implementation of a broadcast mechanism for the air message in the base station.

11. The base station according to claim 1, wherein when the air message is transmitted between a first cell of the base station and a second cell of the another base station, the processer is configured to send or receive the air message through microwave transmission.

12. The base station according to claim 1, further comprises:
a first radio frequency processor, configured for communicating with a UE.
a second radio frequency processor, configured for communicating the air interface with the another base station.

13. The base station according to claim 12, wherein the first radio frequency processor is independent of the second radio frequency processor.

\* \* \* \* \*